UNITED STATES PATENT OFFICE.

JOHN THOMLINSON, OF KNOTHILL WORKS, CARLISLE, ENGLAND.

PLASTER OR CEMENT.

SPECIFICATION forming part of Letters Patent No. 334,489, dated January 19, 1886.

Application filed July 27, 1885. Serial No. 172,793. (No specimens.) Patented in England February 9, 1885, No. 1,778.

*To all whom it may concern:*

Be it known that I, JOHN THOMLINSON, of the firm of Joseph Robinson and Company, of Knothill Works, Carlisle, England, cement and plaster manufacturers, a subject of the Queen of Great Britain, have invented certain new and useful Improvements in the Manufacture of Plaster or Cement, (for which I have made application for Letters Patent in Great Britain, No. 1,778, dated February 9, 1885,) of which the following is a specification.

This invention has for its object improvements in the manufacture of plaster or cement. For this purpose I take plaster-stone or sulphate of lime, and by the usual processes I drive off water from it. I then add an imported mineral known as "tincal," and obtain an intimate mixture of the two in a finely-powdered state. I also incorporate with these materials a proportion of powdered alum. The ingredients are mixed together dry, and I prefer to conduct the manufacture as follows: I grind the calcined gypsum in the usual manner to a fine powder. I also in like manner and separately grind the tincal. I mix the two powders in the proportion of about forty or fifty pounds of tincal to the ton of calcined gypsum. The proportions may be varied. If the quantity of tincal employed be somewhat greater than is stated above, the cement will be hardened, and if less be used the cement will be comparatively soft. The mixture of the two powders is in their dry state and should be very complete. It should be mentioned that gypsum varies much in quality, and that to attain a uniform standard in respect to hardness varying proportions of tincal will have to be used.

In some cases I mix other materials as well as tincal with the calcined gypsum. Thus a good cement is obtained from the following materials: finely-powdered calcined gypsum, one ton; finely-powdered tincal, forty-five pounds; finely-powdered alum, dry, fifteen pounds. The cement thus made I call "Robinson's cement." It is of a similar character to the cements known as "Keen's," "Parian," and "Martin's" cement, and is adapted for use in every way that these cements are used, and for the making of fireproof ceilings and for various other purposes.

The process which I have described is very economical as compared with processes heretofore employed in producing like cements, and Robinson's cement can consequently be delivered in the market at a price which admits of its being employed for purposes for which common lime-plaster is now employed.

Having now particularly described and ascertained the nature of my said invention, and in what manner the same is to be performed, I declare that what I claim is—

The hereinbefore-described cement, consisting of calcined and powdered gypsum and powdered tincal with or without powdered alum, mixed together dry and in about the proportions set forth.

JOHN THOMLINSON.

Witnesses:
    THOMAS LAKE,
      17 *Gracechurch Street, London, E. C.*
    W. P. WARREN,
      17 *Gracechurch Street, London.*